Patented Mar. 18, 1947

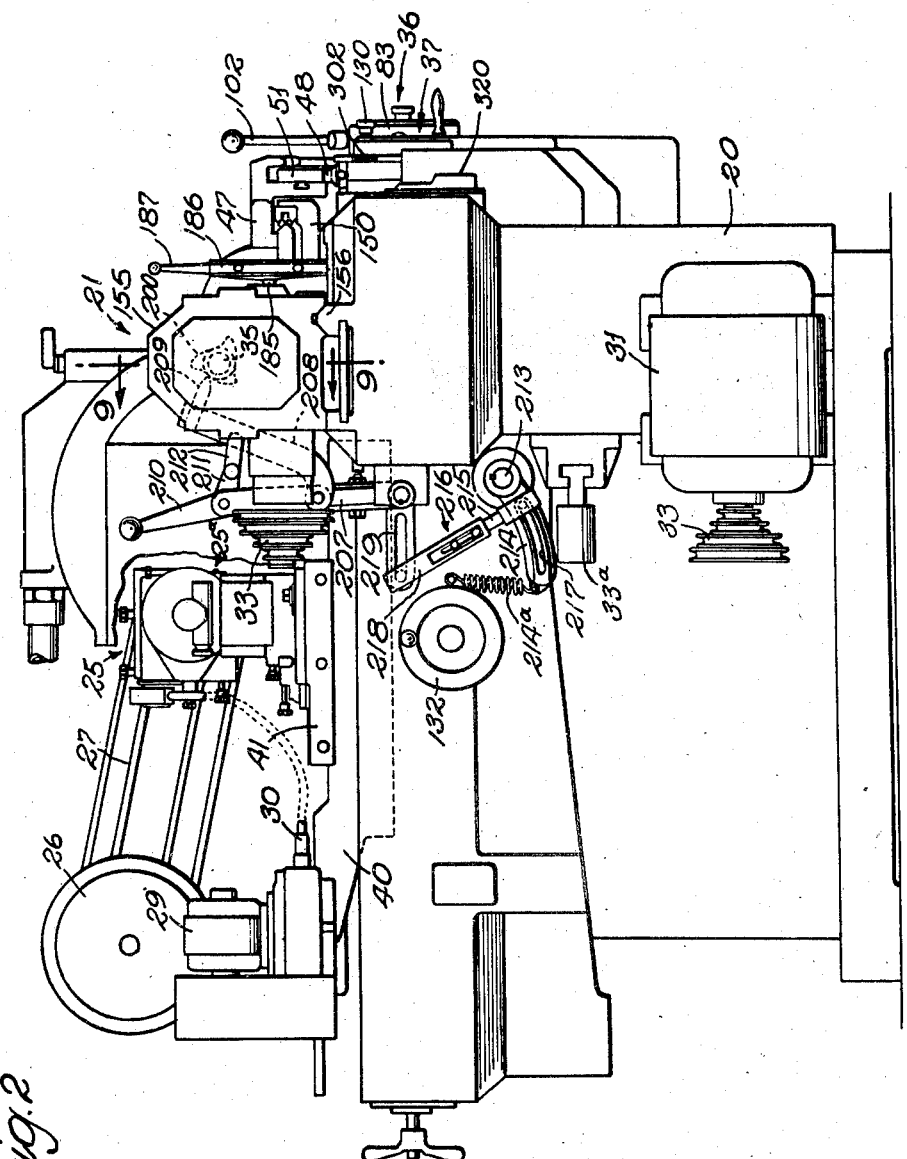

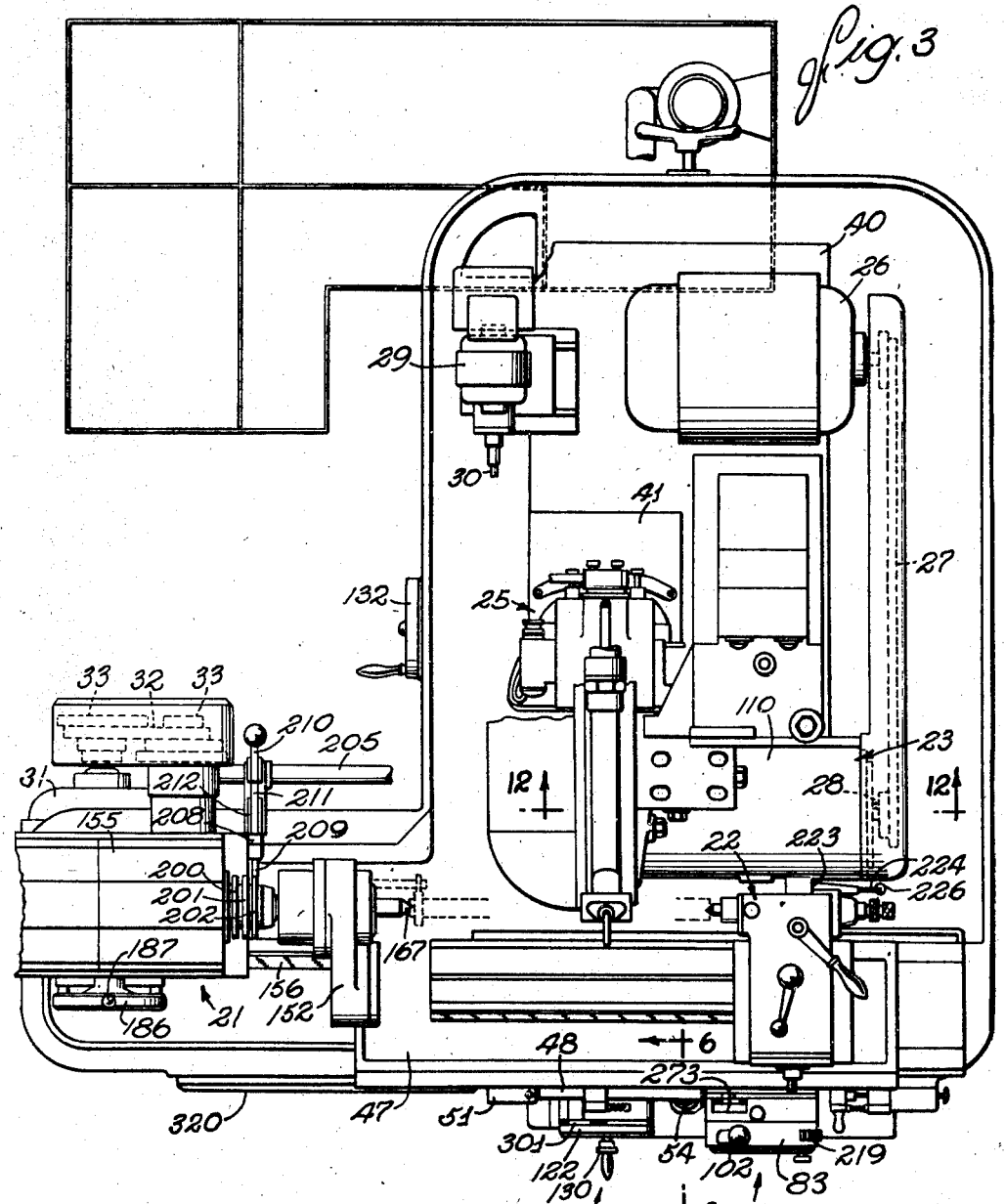

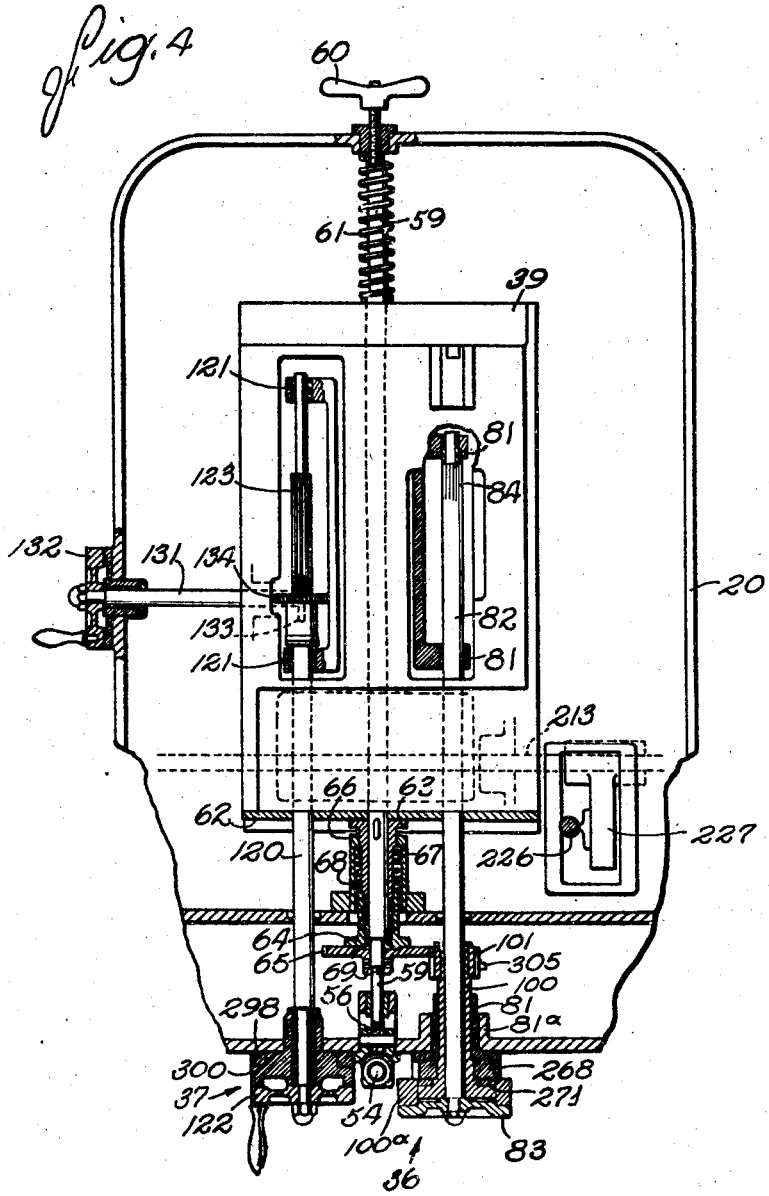

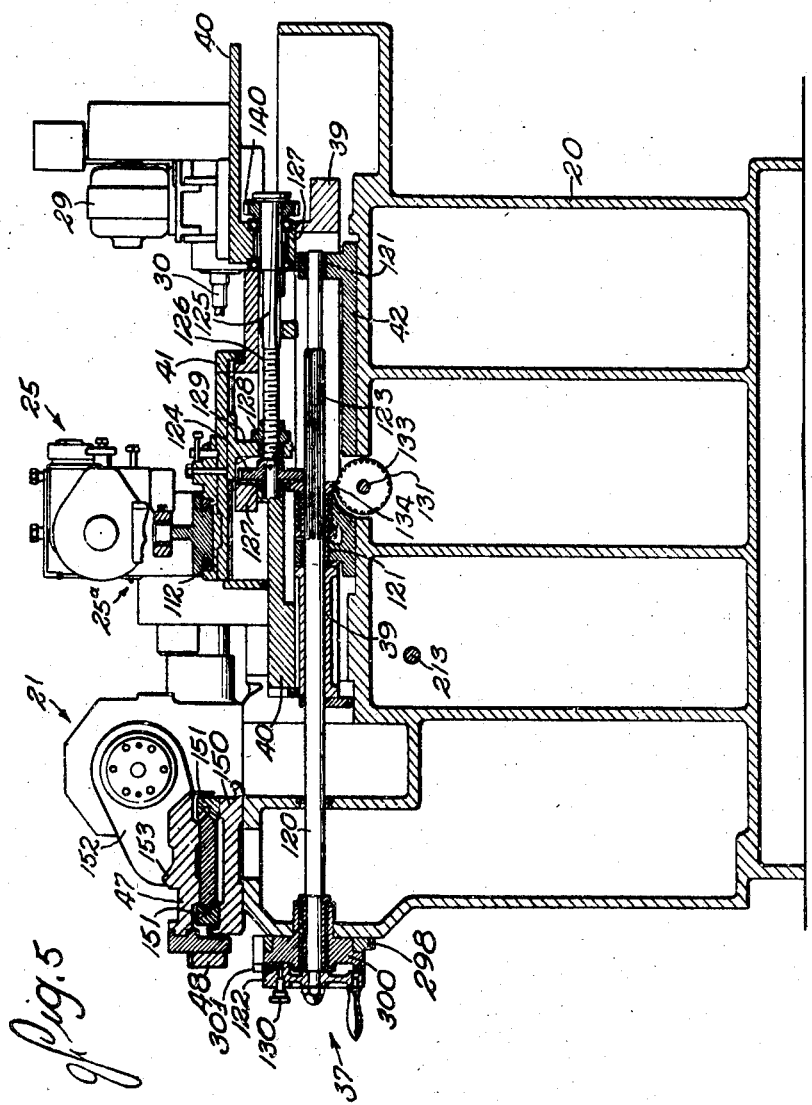

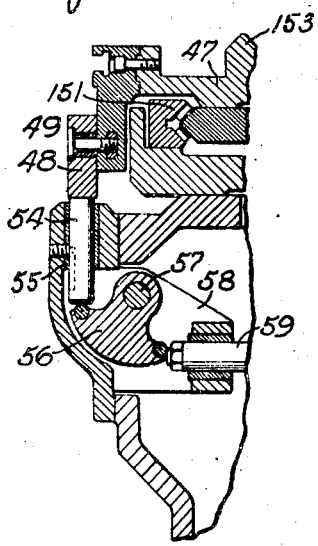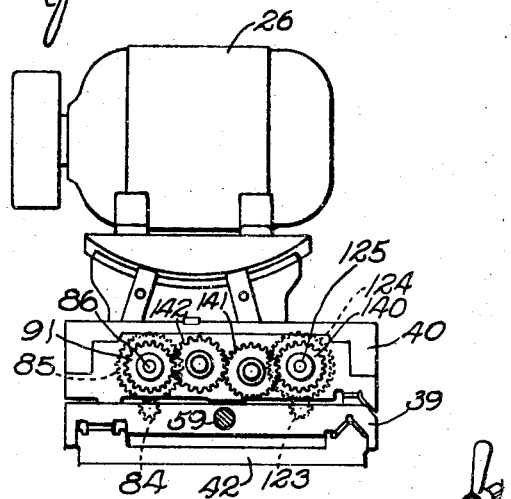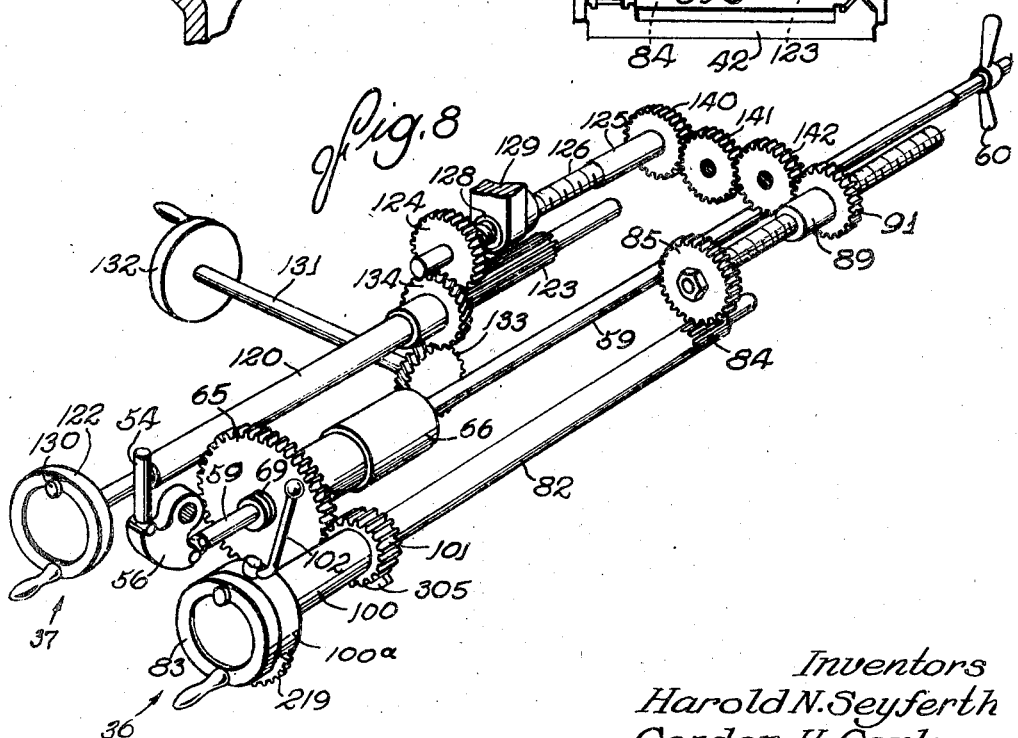

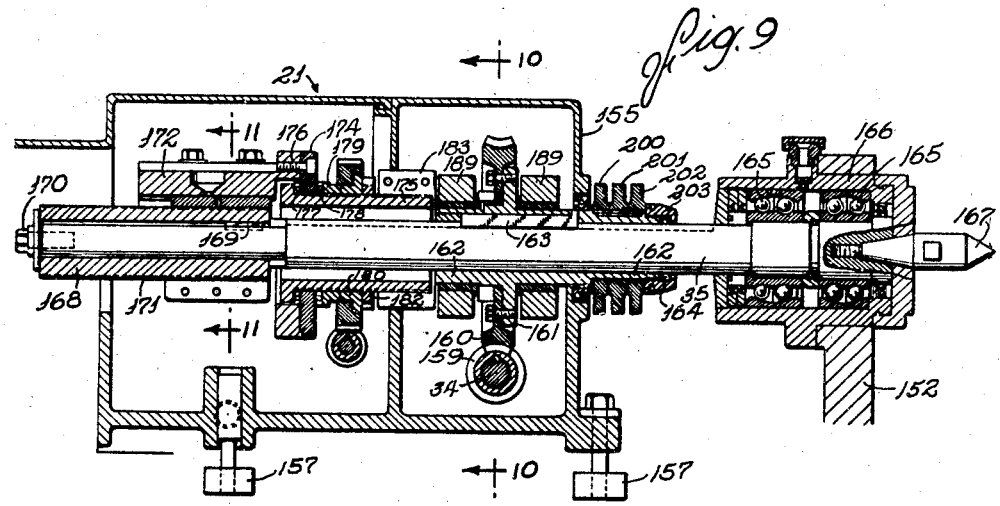
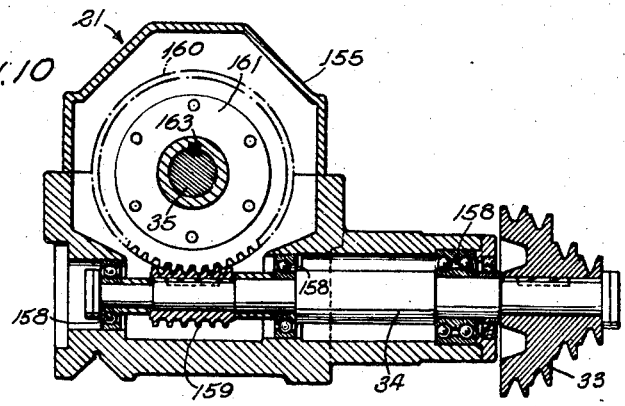
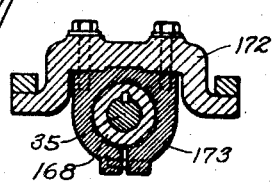

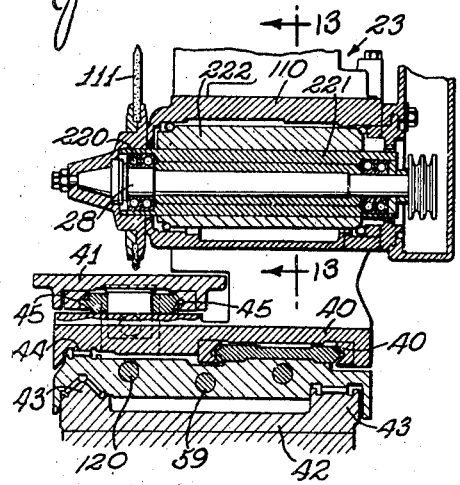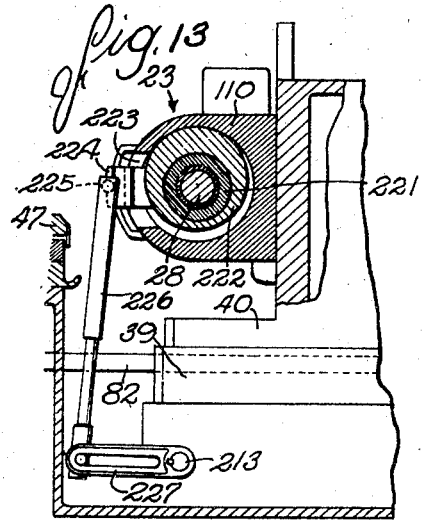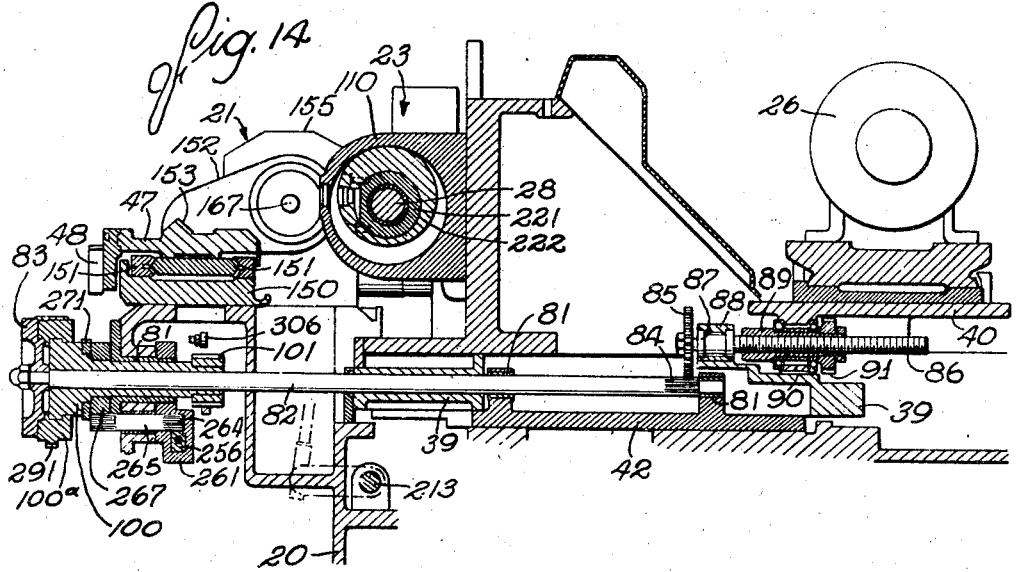

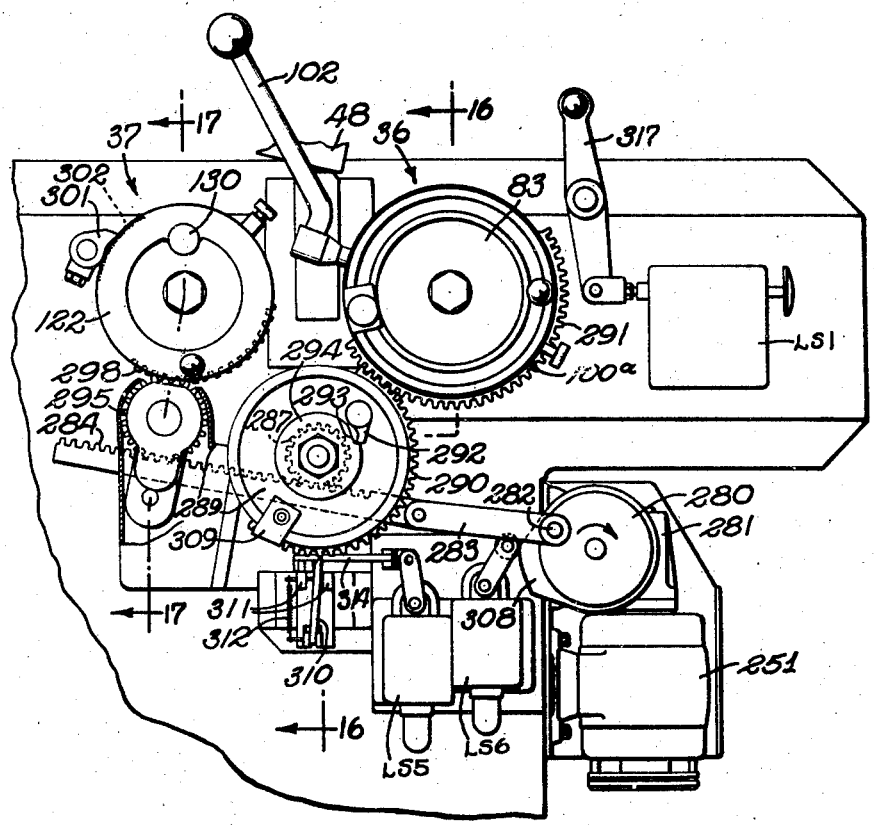

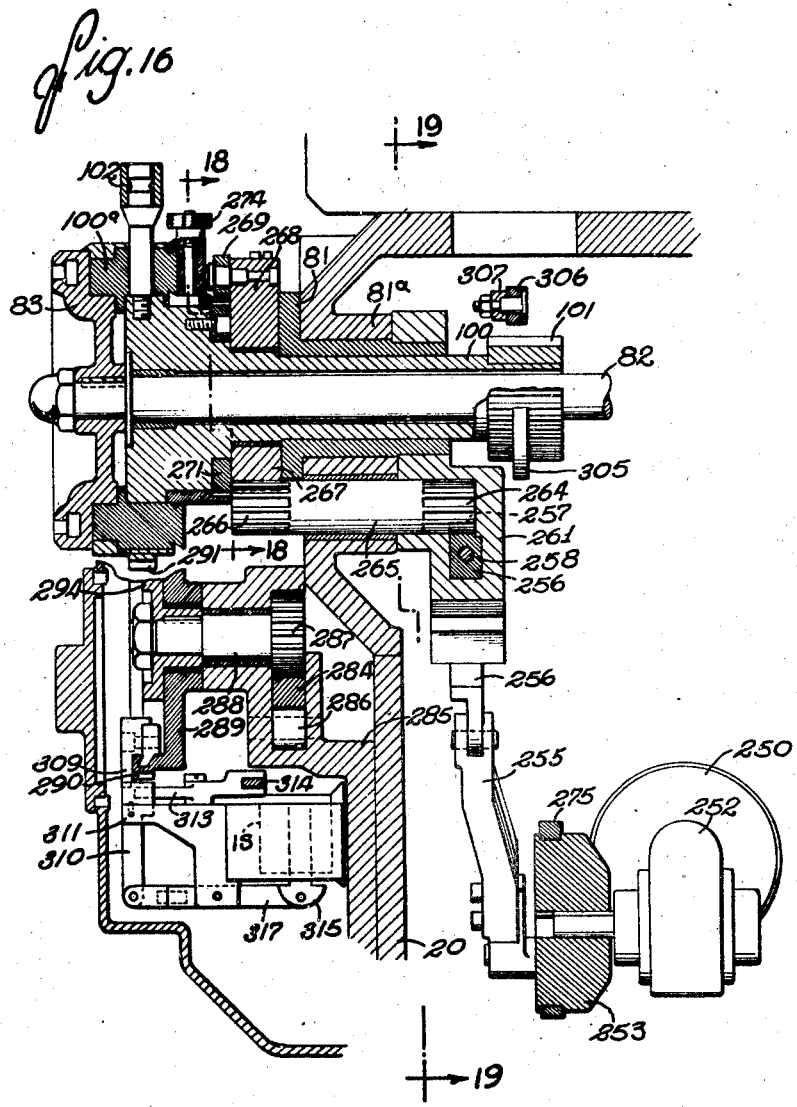

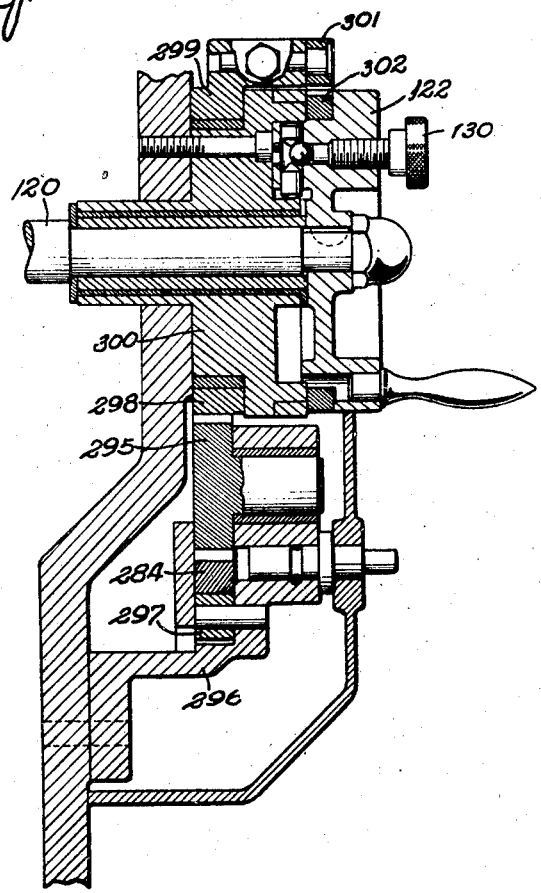

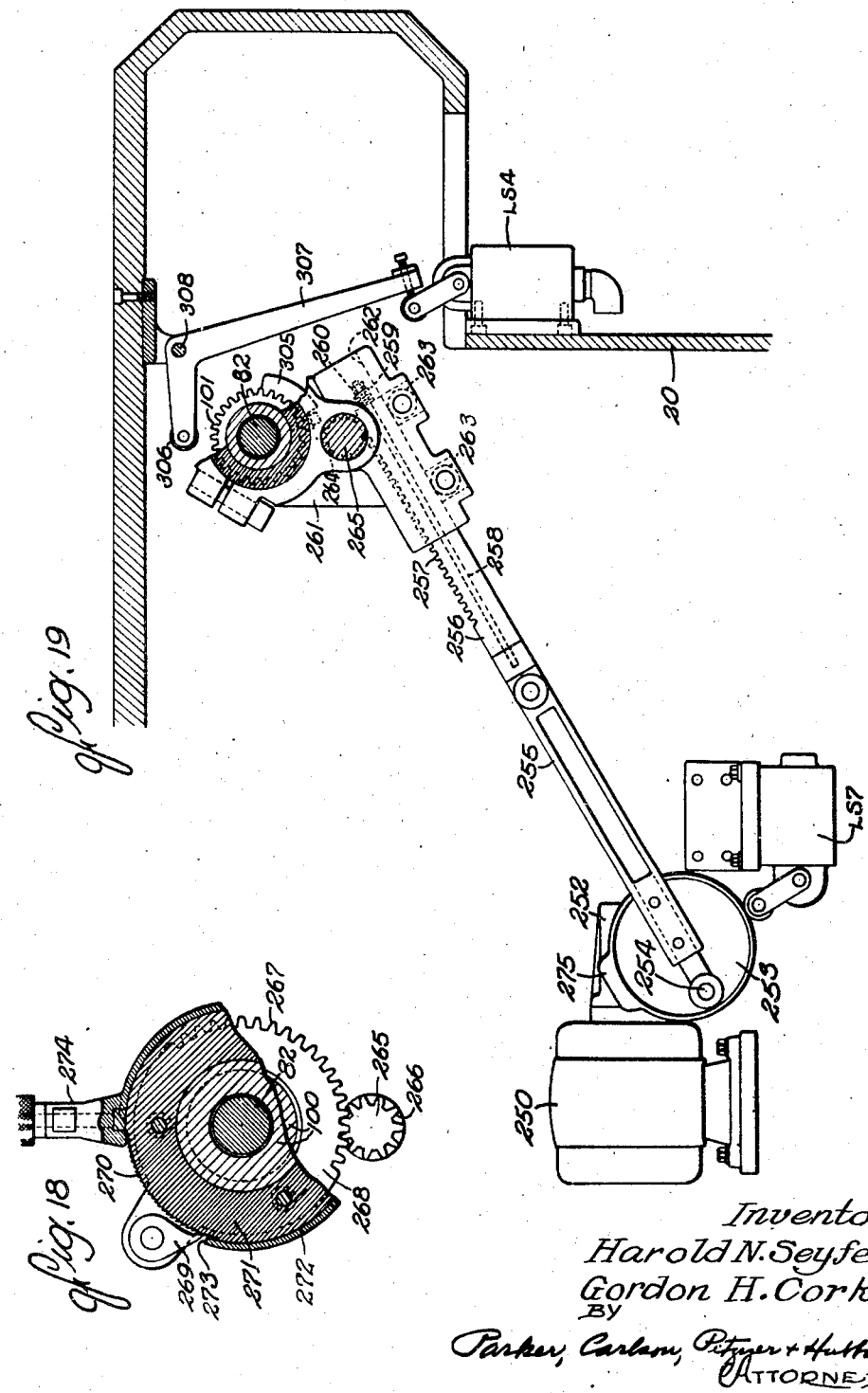

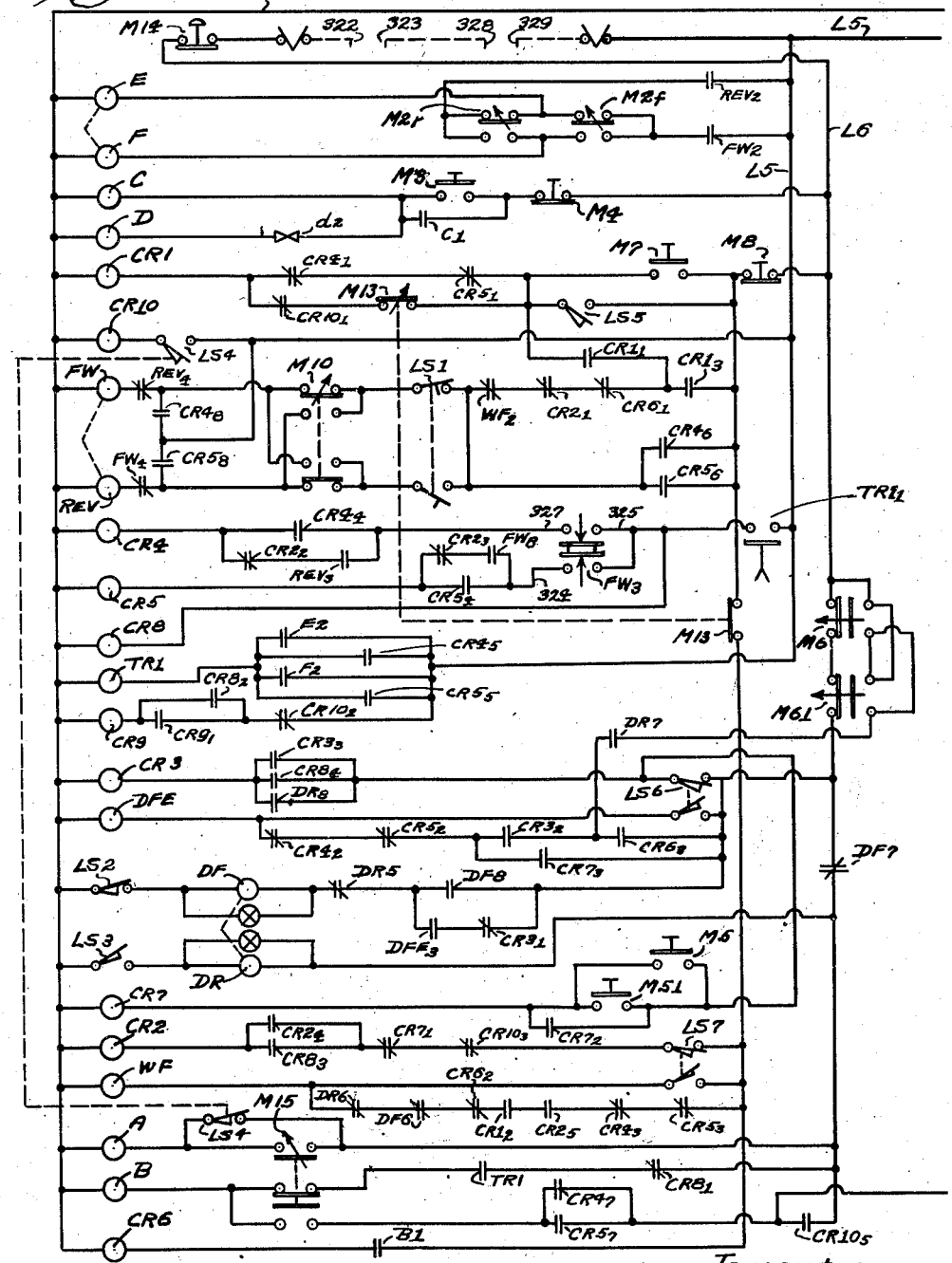

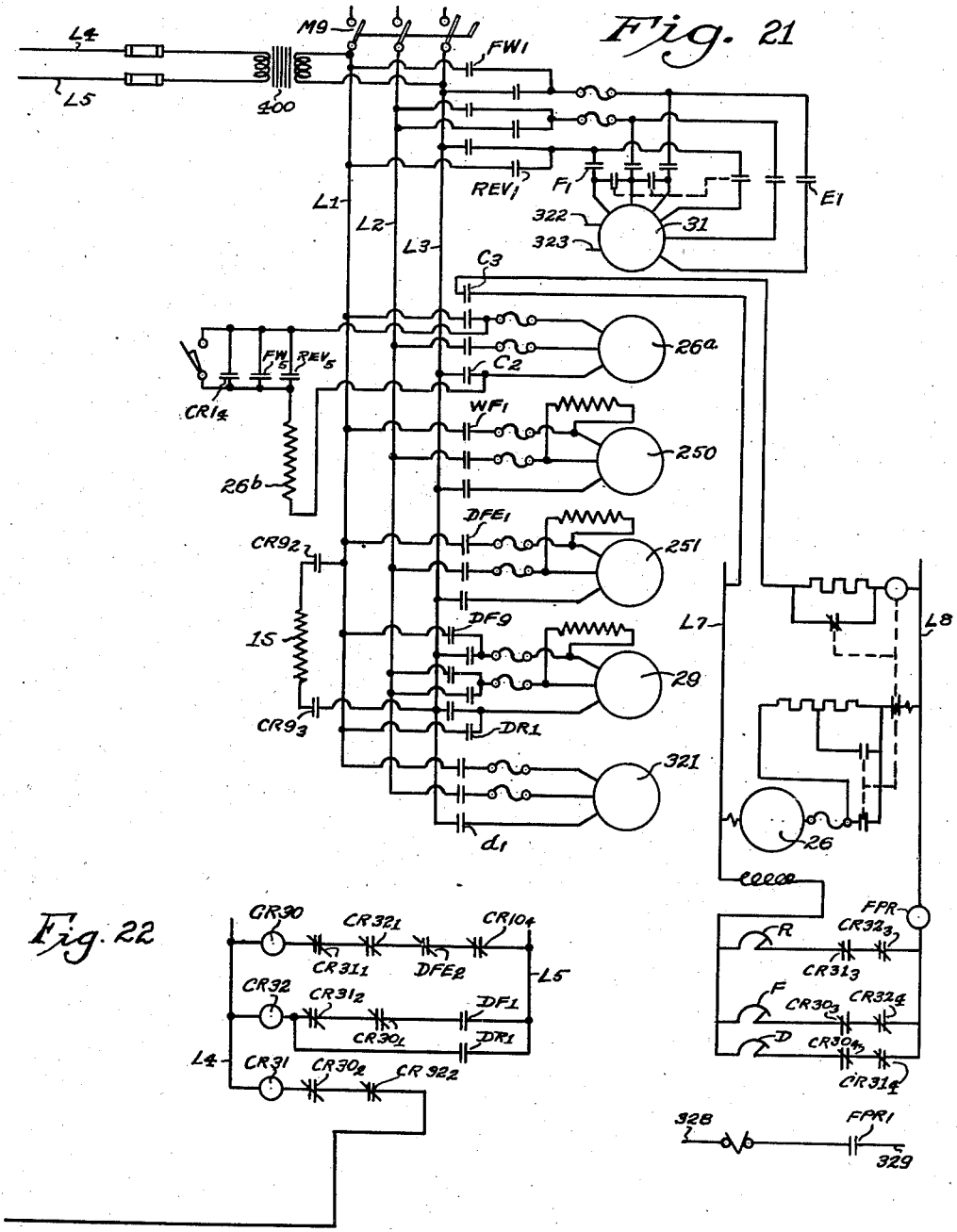

2,417,707

UNITED STATES PATENT OFFICE 2,417,707

AUTOMATIC THREAD GRINDING MACHINE

Harold N. Seyferth, East Detroit, and Gordon H. Cork, Detroit, Mich., assignors to Ex-Cell-O Corporation, Detroit, Mich., a corporation of Michigan Application December 30, 1941, Serial No. 424,984

15 Claims. (Cl. 51—95)

1

The invention relates to machine tools and has particular reference to improvements in thread grinding machines of the automatic type.

One of the objects of the invention is to provide a novel thread grinding machine with an automatic operating cycle in which the grinding wheel is operated selectively at different speeds of rotation at various times, for example, at one speed for rough grinding, at another speed for finish grinding, and at a third speed for wheel dressing.

Another object is to provide a new and improved thread grinding machine having a wheel dressing device and an automatic cycle in which the device is arranged selectively to dress the wheel after any given number of grinding passes, or after any given number of workpieces have been ground.

Other objects and advantages will become apparent as the description proceeds.

In the accompanying drawings,

Fig. 2 is a side elevation of the machine as seen from the left-hand end of Fig. 1.

Fig. 3 is a plan view of the machine.

Fig. 4 is a horizontal sectional view of a part of the machine taken along the line 4—4 of Fig. 1.

Fig. 5 is a vertical sectional view taken substantially along the line 5—5 of Fig. 1.

Fig. 6 is a sectional view illustrating a detail of the mechanism which controls the movement of the grinding wheel in cutting a taper thread and is taken along the the line 6—6 of Fig. 3.

Fig. 7 is a fragmentary rear view illustrating the supporting means for the grinding wheel assembly and dressing device.

Fig. 8 shows in perspective and somewhat diagrammatically means for controlling the relationship of the grinding wheel and the dressing device.

Fig. 9 is a view in vertical axial section through the work head or headstock and is taken along the line 9—9 of Fig. 2.

Figure 1:
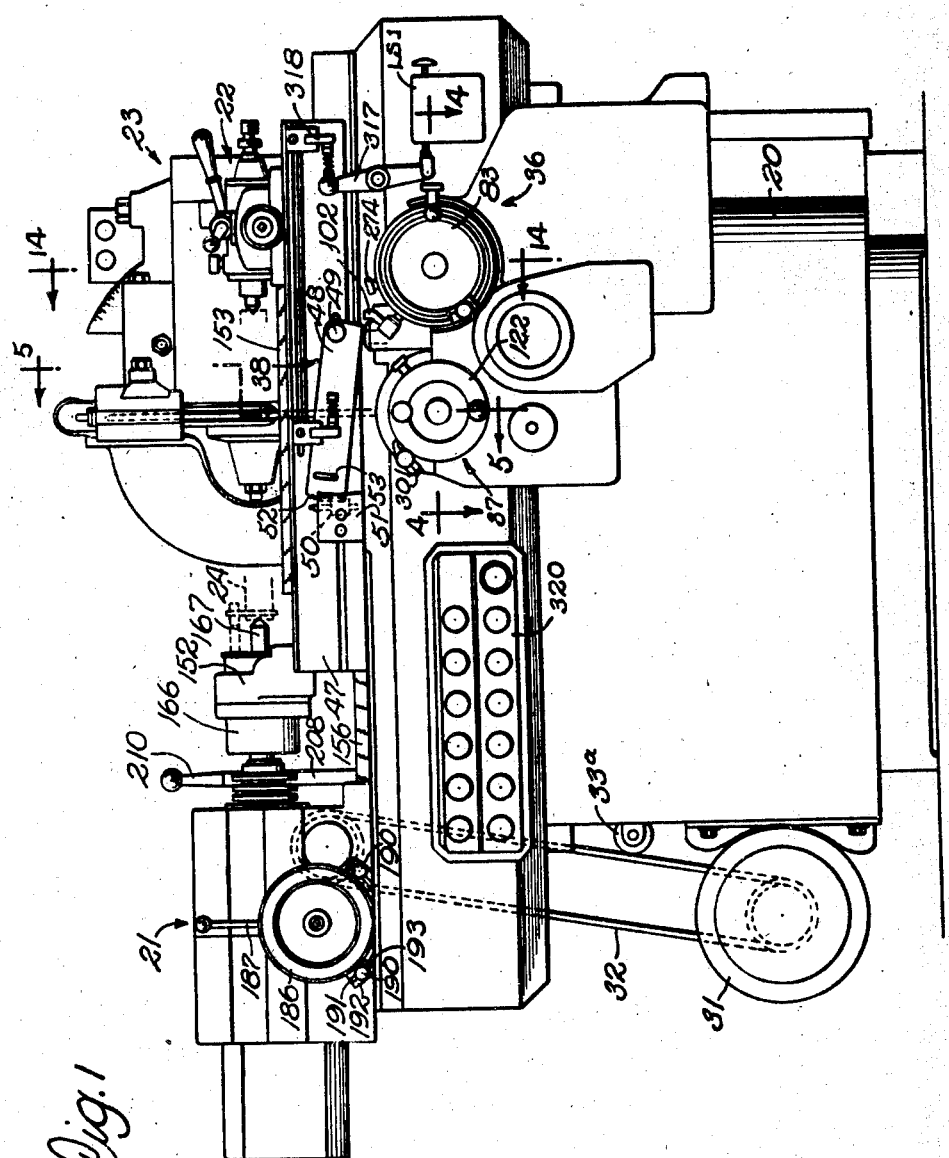
Figure 1 is a front elevation of a machine tool embodying the features of the invention.

Figs. 10 and 11 are transverse sectional views through the work head or headstock taken along the lines indicated by the numerals 10—10 and 11—11 in Fig. 9.

Fig. 12 is a partial sectional view taken on a

2 vertical plane through the axis of the grinding wheel spindle substantially along the line 12—12 in Fig. 3.

Fig. 13 is a transverse sectional view through the grinding wheel spindle assembly taken along the line 13—13 of Fig. 12.

Fig. 14 is a transverse sectional view of the machine taken along the line 14—14 of Fig. 1.

Fig. 15 is an enlarged fragmentary front elevation of the control mechanisms located on the right end portion of the machine as viewed in Fig. 1.

Figs. 16 and 17 are vertical sectional views taken respectively along the lines 16—16 and 17—17 in Fig. 15.

Figs. 18 and 19 are detail sectional views taken respectively along the lines 18—18 and 19—19 in Fig. 16.

Fig. 20 is one portion of the wiring diagram for the control and motor supply system for the machine.

Fig. 21 is another portion of the wiring diagram.

Fig. 22 is still another portion of the wiring diagram.

Machine structure

The present machine, in its illustrated embodiment, has a machine base 20 supporting a horizontally traversable work slide or table 47 with a headstock 21 on its left-hand portion (Figs. 1, 2 and 3) and a tailstock 22 on its right-end portion. A grinding wheel assembly, generally designated as 23, is located rearwardly of a piece of work 24 supported by the head and tailstocks, and a dressing device 25 is located rearwardly of the grinding wheel assembly. Four main operating motors are provided in the machine, including a grinding wheel drive motor 26 on the rear side of the base connected by a belt 27 with a drive shaft 28 for the grinding wheel, and a reversible dresser motor 29 also located at the rear of the base and connected by a flexible shaft 30 with the driven elements of the dressing device. The third motor 31 (Fig. 2) is a reversible feed motor for revolving the work being threaded and traversing it past the grinding wheel, and is connected by a belt drive 32 and stepped cone pulleys 33 with a drive shaft 34 (Figs. 9 and 10) for the work shaft 35. A fourth motor 26a drives a coolant pump (not shown) to supply coolant to the wheel during grinding. Certain additional motors are included in the machine for use in the automatic cyclic operation, but they will be described later.

In the operation of the machine, the work 24 (Fig. 1) is traversed endwise and revolved in timed relation so that the grinding wheel engaging its periphery forms in the work a thread of correspondingly controlled pitch. The wheel is fed toward the work to determine the depth of cut, and is intermittently dressed by the dresser mechanism 25.

The relationship of the grinding wheel and the dressing device, and of the grinding wheel and the work, are controlled simply and conveniently from the operator's station at the front of the machine. The adjustment devices used during manual or non-automatic operation of the machine include a feed control means 36 by which the operator may set the machine to produce a predetermined depth of cut in the workpiece, control the feed of the grinding wheel into the workpiece, or quickly retract the grinding wheel out of engagement therewith. The adjustment mechanisms also include a dressing device control means, generally designated as 37, by which a dressing relationship of the dressing device to the grinding wheel is obtained, and this means also includes means for effecting a compensating adjustment of the grinding wheel to the workpiece, whereby an initial relation of the grinding wheel and workpiece remains fixed regardless of the number of dressing operations or the variation in the diameter of the grinding wheel resulting from the removal of abrasive in the dressing operation. The adjustment means further include means, designated generally as 38, for adjusting the machine to grind straight or tapered screw threads.

The three main adjustment means outlined above are, as will hereinafter be more particularly described, interrelated by a novel arrangement of three superimposed slides arranged for conjoint as well as relative movement and comprising (as shown in Fig. 5) a lower slide 39, an intermediate slide 40, and an upper slide 41. The slides for convenience will hereinafter be termed the taper slide 39, the wheel slide 40 and the dresser slide 41. The three slides have parallel movement in a front to rear direction of the machine base, i. e. transverse to the axis of the work 24. Thus, as shown in Fig. 12, the base has a plate 42 (see also Fig. 5) rigidly secured thereto beneath the taper slide 39 and ways 43 on the plate support the taper slide. On the upper surface of the taper slide 39 are ways 44 supporting the wheel slide 40 and on the upper surface of the wheel slide are ways 45 supporting the dresser slide 41. This superimposed relation of the slides results in conjoint movement of them. Thus, when the lowermost or taper slide 39 is advanced or withdrawn, the wheel and dresser slides 40, 41 move with it. Similarly, when the wheel slide 40 is advanced or withdrawn (over the taper slide), the dresser slide moves with it in addition to the wheel assembly on it. Finally, the dresser slide 41 can be advanced or withdrawn independently of the other two slides.

The actuating means for moving the taper slide will be described first, particular reference being made to Figs. 1, 4 and 6. This taper slide is, in brief, arranged to be moved in timed relation to the work slide 47 carrying the head and tailstocks between which the work 24 is received. It may be noted here that this work slide is mounted on longitudinal ways 151 on the upper surface of the base so that the work slide has a reciprocatory movement as will hereinafter be explained to feed the workpiece 24 in a path generally paralleling the axis of the grinding wheel. To actuate the taper slide for ordinary taper thread cutting, a sine bar 48 is positioned on the front face of the work slide 47, pivoted thereto on a horizontal axis as at 49 through one end of the sine bar. The sine bar is adjustable to vary its angle of inclination relative to the reciprocatory movement of the work slide 47 by such means as a worm 50 supported in a housing 51 on the work slide for engagement with a rack segment 52 on the free end of the sine bar. A shouldered screw 53 engaging the work slide 47 and extending through a coacting arcuate slot in the end of the sine bar, holds the latter in any position of adjustment. The lower side of the sine bar 48, in its movement with the work slide 47, rides over the upper end of a vertically slidable plunger 54 (Fig. 6) supported by a bearing 55. The lower end of the plunger engages one arm of a bell crank lever 56 which is pivoted as at 57 to a support 58, the other end of the bell crank lever being in engagement with the front end of a rod 59, and as shown in Fig. 4, it extends rearwardly through the taper slide 39 and through the rear side of the base. Through the medium of the mechanism next described below, oscillation of this bell crank 56 is used to shift the taper slide.

A wing nut 60 engages the rearwardly projecting end of the shaft 59 and a spring 61 encircles the rear portion of the shaft and bears between the rear wall of the base and the adjacent side face of the taper slide 39. This spring is tensioned to urge the taper slide forwardly. Extending across the front of the taper slide is a wiper plate 62 having an elongated sleeve 63 secured thereto and encircling the rod 59. The forward end of the sleeve 63 has external screw threads thereon for engagement by a nut 64 which is rigid with a gear 65. An elongated collar 66 secured to the sleeve 63 encloses the end of the nut 64 as well as a spring 67 which is seated against a shoulder on the sleeve 63 and exerts its force against the end of the nut 64 through a thrust washer 68. Movement of the nut 64 and gear 65 axially of the rod 59 is prevented by thrust bearings 69 fixed on the rod 59 on opposite sides of the gear 65. Thus, when the bell crank 56 is oscillated counterclockwise (as viewed in Fig. 8) it thrusts the rod 59 inward and thereby moves the taper slide inward, force being transmitted to the latter through the rod 59, thrust washer 69 and the gear and nut and collar assembly at the front of the slide (Fig. 4). Similarly, oscillation of the bell crank 56 in the opposite direction permits the taper slide 39 to move forward under the urging of the spring 61 on the rod 59.

In some instances the taper slide may be used to move the slides 40, 41 superimposed on it for some other purpose than in grinding a taper thread, as for example quick retracting the grinding wheel from the work or feeding the wheel toward the work. For such cases, rotation of the gear 65 is used to effect movement of the taper slide, as next described.

Rotation of the gear 65, by means to be described, will move the taper slide 39 rearwardly or return it to a predetermined position relative to the rod 59. The screw threads on the nut 64 and sleeve 63 preferably have a coarse pitch to produce movement through a fairly wide range by limited rotation of the gear 65. This movement by the gear 65 is incidental to and independent of movement transmitted to the taper slide by the sine bar through the plunger 54, bell crank 56, rod 59, thrust washer 60 and the gear, nut and collar assembly at the front of the taper slide. The wing unit 60 limits the forward movement of the taper slide and when it is desired to render the sine bar ineffective, as in grinding straight threads, the wing nut 60 may be turned to draw the holding rod 59 rearwardly against the tension of the spring 61 to a position in which the front end thereof cannot be engaged by the bell crank.

Movement of the taper slide 39 by rotation of the gear 65 and nut 64 is possible even when the rod 59 is retracted by the wing nut 60 to disable the true taper controlling action of the slide, and consequently movement of the taper slide may be and is employed to shift the grinding wheel toward and away from the position to which the grinding wheel is adjusted for the required size or depth of cut in the workpiece. In other words, the taper slide is used to withdraw the superimposed wheel slide 40 as occasion may require but without disturbing the previous precision determined setting of the wheel slide's own adjusting mechanism. Hence, when the taper slide is later restored to its initial position, the wheel slide will also be brought back without the necessity of regauging the position of the wheel on it relative to the taper slide and, hence, relative to the work.

The actuating means 36 for adjusting the grinding wheel to a position relative to the work, either by taper or wheel slide movement, is best seen in Figs. 4, 8 and 14. Rotatably supported by bearings 81 on the plate 42 and a boss 81ª on the front wall of the base is a shaft 82 which extends slidably and rotatably through the front portion of the taper slide 39. Beyond the front wall of the base, the shaft has a hand wheel 83 fixed thereto. Near its rear end the shaft has an elongated spur gear 84 thereon for engagement with a spur gear 85 on a lead screw 86 (Fig. 14) which extends rearwardly and is journaled as at 87 for rotation without axial play in a boss 88 extending upwardly from the taper slide 39. The rear end of the lead screw 86 is threaded in a nut 89 which is rotatably supported without axial play by a boss 90 depending from the wheel slide 40.

Rotation of the shaft 82 by rotation of the hand wheel 83 at the operator's station will, through gears 84, 85, rotate the lead screw 86 in the nut 89 to move the wheel slide 40 transversely of the workpiece. This adjustment enables the operator to set the wheel slide 40 at the position which determines the final or finished size of the workpiece. The nut 89 has on its rear end a spur gear 91, the purpose of which will presently be described.

Associated with the size control shaft 82 is manual control means for moving the taper slide 39 by rotation of the gear 65, this movement being utilized to retract the grinding wheel wholly or partially from a workpiece and to advance the grinding wheel to engage the workpiece or to feed the grinding wheel incrementally into the workpiece until the grinding wheel has cut to the finished size determined by the preliminary setting of wheel 83. Thus, referring to Figs. 4 and 14, sleeve 100 encircles the front end of shaft 82 rearwardly of the hand wheel 83 and is elongated to extend through the front bearing 81 in the boss 81ª on the base. At its rear end within the base the sleeve 100 carries an elongated gear 101 in mesh with the gear 65 carried on the taper slide rod 59. Adjoining the hand wheel, an enlarged ring 100ª is secured to the sleeve 100 to support a hand lever 102 (Figs. 1 and 4) by which the sleeve 100, the gears 101, 65 and the nut 64 may be rotated to retract or advance the taper slide 39. Since the grinding wheel assembly 23 is mounted on the taper slide 39, such movement will vary the depth of the cut made by the grinding wheel in the workpiece. Thus, the grinding wheel may be quickly withdrawn from the work at the end of or during a cut for replacement of the workpiece or to dress the grinding wheel without altering or disturbing the initial adjustment for size obtained through shaft 82. Preferably, suitable stops (not shown) are provided to limit the handle movements 102 to an arc which will produce a travel of the taper slide only slightly greater than that necessary to retract the grinding wheel periphery to clear the greatest depth of thread which will be cut.

The grinding wheel assembly 23 includes a wheel head 110 (Fig. 12) in which the drive shaft 28 for the grinding wheel 111 is journaled. The wheel head is suitably mounted on a side of the wheel slide 40 for angular adjustment of the grinding wheel in conformity with the helix angle of the thread being cut on the workpiece. The driving motors 26, 29 for the grinding wheel shaft and the dressing device respectively are mounted on the wheel slide 40 near the rear end thereof. The dressing device is mounted on the dresser slide 41 behind the grinding wheel 111 and the mounting includes a transverse slide 112 (Fig. 5) for properly alining the dressing devices with the edge of the grinding wheel.

Referring to Figs. 4 and 5, the manual adjusting means 37 for the dressing device includes a shaft 120 extending rearwardly from the operator's station in front of the machine into the taper slide 39 where its rear portion is supported by spaced bearings 121 on the plate 42. The shaft is rotatably and slidably supported by the taper slide 39 and an operator's hand wheel 122 is secured to its front end. Along its rear portion the shaft has an elongated spur gear 123 engaged by a spur gear 124 secured to the front end of a shaft 125 having a feed screw thread 126 formed thereon. The shaft 125 is rotatably supported without axial play by bearings 127 on the wheel slide 40. The feed screw 126 is engaged by a nut 128 carried by an arm 129 depending from the dresser slide 41. Thus, movement of the dresser slide to effect a dressing engagement of the dressing diamonds or the like (one of which is indicated at 25ª in Fig. 5) with the rear side of the grinding wheel 111 may be obtained by rotation of the hand wheel 122 and any desired relationship may be maintained by suitable locking means 130.

For the convenience of the operator in setting up the machine from the left-hand end thereof, supplemental means for rotating the shaft 120 may be provided. This means, as shown, comprises a cross shaft 131 rotatably mounted on the base to extend from beneath the shaft 120 through the left end of the base. The outer end of the cross shaft has a hand wheel 132 thereon and the inner end carries a spiral gear 133 meshing with a similar gear 134 on the shaft 120.

The manual adjusting means which have been described enable the operator to set the machine to cut to size or depth, to move the dressing device into dressing engagement with the grinding wheel, and to shift the grinding wheel and dressing device as a unit toward and away from the workpiece. Additionally, means is provided for automatically compensating for the variation in the grinding wheel diameter resulting from the dressing operations, whereby to maintain constant the original setting determining the finish size or depth of cut.

Referring to Figs. 5, 7 and 8, the compensating means, according to the present embodiment, includes the following arrangement: The rear end of the dresser slide control shaft 125 has a spur gear 140 secured thereon which, through a pair of intermediate pick-off idler gears 141, 142 (Fig. 7), drives the gear 91 on the rotatable nut 89. This nut (as previously described) is rotatably mounted without end play on the wheel slide 40 and engages the feed screw threads on the shaft 86 carried by the taper slide. Thus, when the dresser slide 41 is moved toward or away from the grinding wheel 111, the rotary movement of the shaft 125 also drives the nut 89 through gears 140, 141 and 142 to move the nut along the stationary shaft 86, thereby shifting the wheel slide 40 in the direction of the dresser slide movement. The arrangement is such that the wheel slide 40 is moved through the distance required to maintain the initial size or depth of cut relation between the grinding wheel and the work. In other words, when the dresser slide 41 moves relative to the wheel slide 40, the wheel slide also moves an equal distance (carrying with it the dresser slide) to compensate for the reduction in wheel radius by the removal of material from the grinding wheel in dressing it. One of the idler gears 141 or 142 may be disengaged to enable the operator to adjust initially the dressing device along the wheel slide without movement of the latter.

The supporting and driving means for the workpiece includes means for rotating the workpiece and for translating it with a feed movement past the grinding wheel 111. Also included is means actuated in timed relation to workpiece rotation for advancing and retracting the grinding wheel relative to the workpiece for relief cutting as, for example, in grinding taps or hobs.

Referring to the machine structure which supports and drives the workpiece, a plate 150 (Figs. 5 and 14) along the front side of the base has adjustable opposed V-shaped ways 151 which, through interposed roller elements, support the work slide 47 for reciprocatory movement.

Extending upwardly and rearwardly from the left-hand end of the work slide 47 is a pedestal 152, the purpose of which will be presently described. The upper surface of the work slide is provided with ways 153 for adjustably supporting the tailstock 22. The headstock or work head structure 21 includes, as may be seen in Figs. 1, 2, 3, 9 and 10, a housing 155 is supported by side and bottom guideways 156 on the base for adjustment along the line of movement of the work slide. Suitable lock means 157 (Fig. 9) secure the work head in an adjusted position. To maintain the driving belt 32 taut in the various positions of adjustment of the work head, such means as an adjustable idler pulley 33ª (Fig. 2) may be employed.

The shaft 34, as shown in Fig. 10, extends into the lower portion of the housing 155 and is rotatably supported therein by spaced bearings 158. Centrally of the housing the shaft 34 has a worm 159 keyed thereto for engagement with the worm wheel 160 secured to a flange 161 on an elongated sleeve 162, which slidably encircles the work shaft 35. Such means as a sliding feather key 163 drivingly connects the sleeve and shaft. One end of the shaft 35 (the right-hand end as shown in Fig. 9) extends through a dust seal 164 at the end of the sleeve and is supported by combined radial and thrust bearings 165 in a housing 166 which is secured to the end of the pedestal 152. A live center 167 on the shaft 35 extends beyond the housing 166 for engagement with the workpiece.

At its opposite end the shaft 35 (Fig. 9) is of reduced diameter to receive an elongated sleeve or shell 168 which is keyed to the shaft as at 169 and is detachably secured thereon by cap screw and washer means 170. The external surface of the collar 168 has precise lead screw threads 171 therein and the sleeve illustrated is one of a series of interchangeable sleeves which differ from each other in the pitch of the thread either in a right-hand or left-hand direction. A slidable nonrotatable frame 172 has secured thereto, as shown in Fig. 11, a split nut 173 constituting a master lead nut engageable with the lead screw on the sleeve 168. The nut is also interchangeable. Fixed on the inner end of the frame is a centrally apertured disk 174 through which the shaft 35 extends. A flanged collar 175 encircles the shaft 35 and extends through the aperture in the disk 174 to dispose the collar flange 176 behind the disk. Between the disk 174 and the flange is a thrust washer 177 and on the other side of the disk is another thrust washer 178 abutted by a spacing ring 179 in turn engaged by a ring 180 carrying a worm gear 181. A nut 182, engaging external screw threads on the collar 175, frictionally engages the ring 180 to establish a driving relation between the worm wheel 181 and the collar 175, as well as to bind the disk 174 between the thrust washers 177, 178 and against the flange 176. External screw threads on the collar 175 engage an internally screw threaded member 183 which is fixed to the housing 155. The worm wheel 181 is engaged by a worm 184 on a shaft 185 which is journaled on the housing and extends through the front side thereof, and a wheel 186 having an operating handle 187 is secured to the front end of the shaft. The numeral 189 (Fig. 9) designates bearings in the housing 155 for supporting the shaft 35 and its associated mechanism.

In operation, the housing 155 is adjusted longitudinally of the base to dispose the workpiece between the head and tailstock centers substantially in proper relation to the grinding wheel. A more accurate relation is obtained by rotation of the wheel 186 which, through shaft 185, worm 184, worm wheel 181, rotates collar 175 to shift it longitudinally of the work head casing 155. Since the sliding frame 172 is connected through disk 174 with the collar 175, axial movement of the latter will shift the frame 172, thereby moving the master lead screw and nut and the shaft 35 axially. Such axial movement of the shaft 35 is transmitted to the worktable and tailstock thereon through the pedestal 152 to adjust the position of a workpiece mounted between the head and tailstock centers with respect to the grinding wheel. The means just described, after the initial adjustments have been made, is used to "pick up" the lead on successive workpieces at the beginning of a cutting operation.

The same mechanism has a further purpose. Machines of the type here under consideration may be arranged to perform a cutting operation during movement of the workpiece past the grinding wheel in either direction. It is impossible to eliminate entirely backlash or play in the mechanism which feeds the workpiece and compensation must be made for such backlash at the beginning of each reversal of movement. The means for shifting the shaft 35 axially is used to compensate for backlash. Thus, a pair of stops 190 (Fig. 1) mounted for adjustment along an arcuate slot 191 on a bracket 192 adjacent to the periphery of the wheel 186 limit the movement of a pin 193 projecting radially outwardly from the wheel. By properly determining the amount of backlash in any given assembly and by adjusting the stops 190 to limit movement of the wheel 186 through an arc which will produce a commensurate backlash compensating movement of the shaft 35, the operator need only rotate the wheel 186 from one stop to the other at each reversal.

The means in the present machine for moving the grinding wheel for relief or backoff grinding of such cutting tools as taps, hobs, and the like, will be described with reference to Figs. 2, 3, 9, 12, 13 and 14. As shown in Fig. 9, the collar 162, through which the shaft 35 is driven, has a series of cams 200, 201, 202 keyed thereto externally of the housing 155 and held in place by a nut 203. These cams may be termed relieving cams and are formed with various numbers of lobes equal to the number of flutes which are to be relief ground. The cams moreover are shaped to produce the required movement of the grinding wheel.

Referring to Figs. 2 and 3, a rock shaft 205 is mounted to extend along and below the work head 155 in a direction parallel to the line of adjustment of said head. Slidably mounted on the rock shaft 205, as by a feather key, is an upstanding lever 207. Suitable means, not shown, is provided for securing the lever to the rock shaft at various positions along the length thereof. Pivoted intermediate the ends of the lever 207 is an arm 208 which extends upwardly at an acute angle to the lever. A cam follower 209 is mounted on the upper end of the arm 208 for engagement with one or another of the relieving cams 200, 201 and 202, as determined by the position of the lever 207, on the rock shaft 205. Pivoted on the upper end of the lever 207 is a bell crank lever having a long arm 210 upstanding to provide a handle and a short arm 211 extending toward the cam follower arm 208.

The end of the arm 211 is connected by a link 212 with the arm 208 to provide a toggle. The arrangement is such that when the handle arm 210 of the bell crank lever is in its forward position (toward the right in Fig. 2), the toggle is extended with the center pivot of the toggle slightly past dead center. In this relationship, movement of the cam follower arm 208, produced by the cam with which the follower 209 is associated, will be transmitted to the lever 207. Rearward movement of the handle 210 will break the toggle alinement and withdraw the cam follower 209 to an inoperative position.

The cam induced movements of the work shaft 205 are transmitted to a second shaft 213 by means which is adjustable through a wide range to determine the ratio of movement between the rock shafts 205 and 213, as well as the rotative position of the rock shaft 213. The rock shaft 213 is journaled on the machine base to extend longitudinally thereof to a position beneath the grinding wheel spindle assembly. On its outer or left-hand end the shaft has an arm 214 secured thereto. A section 215 of an extensible link 216 is arranged to be adjustably secured to the arm along the length of an arcuate slot 217 therein. The other section 218 of the link 216 has an adjustable connection with a slotted arm 219 secured to the rock shaft 205. By adjustment of the length of the link 216 and the relationship of the ends of the link to the arms 214 and 219 substantially any required movement of the rock shaft 213 may be obtained. Spring means 214a connected to the end of the lever 214 and to the base exerts a force in a direction tending to hold the cam follower 209 in cam engagement.

This movement of the rock shaft 213 advances or retracts the grinding wheel relative to the workpiece and in timed relation to the rotational movement of the workpiece. Referring to Figs. 12, 13 and 14, the grinding wheel spindle or drive shaft 28 is supported by bearings 220 in a spindle casing 221 which extends through an eccentric bore in a carrier 222. The carrier is supported for oscillatory movement by the wheel head 110. The wheel head has a circumferentially extending slot 223 (Fig. 13), and the short end of an angular arm 224 rigid with the carrier 222 extends through the slot. The outer longer end of the arm extends along the wheel housing and at its end has a ball and socket connection indicated at 225 with the upper end of a link 226. The link is adjustably secured at its lower end to an arm 227 fixed on the rock shaft 213. Hence, rocking movement of the shaft 213 will oscillate the carrier 222 which movement, because of the eccentric relation of the shaft 28 to the carrier 222, will produce a desired reciprocatory relieving movement of the grinding wheel with respect to the workpiece.

*Automatic cycling apparatus*

Provision has been made for operating the machine described above entirely automatically. In brief, the controls are such as to execute an automatic cycle in which:

(a) The work slide 47 is transversed back and forth to move a corresponding portion of the workpiece past the engaging grinding wheel with a dwell at the end of each stroke of the work slide.

(b) During the dwell period at the end of each work slide stroke the taper slide 39, and the wheel slide 40 on it, are fed forward a predetermined increment of distance to increase the depth of cut during the succeeding pass of the work.

(c) After incremental infeeding of the taper slide has reached a predetermined total, the dresser mechanism 25 is fed a predetermined increment of distance, and a cycle of operation for the dresser instituted.

(d) At the conclusion of the dresser operation, the dresser mechanism comes to rest and the wheel slide 40 is fed to final depth, and the work slide 47 is given an additional traverse for finish grinding.

Reference has heretofore been made to four motors included in the machine, namely, the work feed motor 31, the dresser drive motor 29, and the grinder drive and coolant pump motors 26 and 26a. In addition, two further motors are provided for use during automatic operation, these being a grinder wheel feed motor 250 and a dresser feed motor 251. If desired, a refrigerator motor and a suction fan motor may also be provided. In brief, the grinder feed motor 250 is used to turn the sleeve 100, heretofore noted (see Fig. 4) in a direction to feed the grinding wheel 111 toward the work. This feeding is accomplished in successive increments. The dresser feed motor is used to turn the shaft 120 to feed the dresser mechanism 25 an amount required to dress down the wheel for the final grinding pass.

To correlate the operation of all six motors noted above in an integrated system so that the various elements of the machine will be operated in proper timed relation, a series of machine element-operated, or so-called limit switches, are utilized.

Before proceeding to a description of the control circuit through which the various motors and element-operated switches are interrelated, attention will be given to the details of the mechanical connections between the motors 250, 251 and the parts which they operate. First, as to the grinder feed motor 250 (see Fig. 19) it is to be noted that, in general, it operates through a rack and pinion arrangement to drive a ratchet mechanism which in turn steps the sleeve 100 around step by step for successive increments of infeed for the grinder. For this purpose, the motor 250 is connected through a speed reduction gearing in a casing 252 to revolve a stroke disk 253 one full revolution for each increment of infeed. The stroke disk has on it an eccentric crank pin 254 by which it is connected to a reciprocable member made up of two sections 255 and 256, the outermost one having rack teeth 257 on it. The two sections 255, 256 are yieldably joined by means including a rod 258 extending through a longitudinal bore in the section 256 and anchored at the outer end to the section 255. At the outer end of the rod 258, a helical compression spring 259 encircles it and is interposed between the outer end of the section 256 and a nut 260 on the end of the rod. A housing 261 having a portion encircling the end of the bearing 81, which receives the sleeve 100 (see also Fig. 16), presents a throat 262 receiving the rack section 256 and has rollers 263 journaled in it and on which the member 256 runs. The rack teeth 257 mesh with pinion teeth 264 on a shaft 265 (Figs. 16 and 19) to revolve the latter as the rack reciprocates.

At its opposite end, the shaft 265 has a second set of pinion teeth 266 (Figs. 16 and 18) meshing with a toothed sector 267 of a spider 268 loosely journaled on the sleeve 100. This spider 268 carries a pawl 269 engageable with a sector of ratchet teeth 270 on the periphery of a collar 271 fixed to the sleeve 100. Each stroke of the pawl 269, effected by a stroke of the feed motor-driven rack 255—256, causes the pawl 269 to engage the teeth 270 and advance the sleeve 100 a predetermined incremental distance. The amount of such advance for the sleeve 100 for each stroke of the pawl 269 is determined by the setting of an adjustable guard sleeve 272 encircling the ratchet-toothed collar 271 and having an opening 273 in it (see Fig. 18) through which the ratchet teeth 270 are exposed. The guard 272 is adjustable about the axis of the sleeve 100 and can be locked in adjusted position on the collar 100a (see Fig. 16) by locking means indicated as 274. By changing the rotational setting of the guard 272, the number of ratchet teeth advanced by the pawl 269 during each stroke of the latter is controlled.

The stroke disk 253 driven by the grinder feed motor (Fig. 19) also has a cam lobe 275 on it for actuation of the limit switch LS7 which operates, in a manner hereinafter described, to stop the motor 250 at the end of each full revolution or feed cycle of the stroke disk 253. In Figs. 18 and 19, the parts are shown in the positions which they occupy after the stroke disk has made one-half of a revolution, being in effect, stop-motion views.

Turning now to the motor 251, it should be noted, in general, that it is available to operate the sleeve 100 for a quick retract motion of the grinding wheel, and also to feed the dresser mechanism 25 a predetermined increment of distance necessary for dressing the grinding wheel.

However, the retract motion can be disabled at the will of the operator so as to employ the motor only for dressing feed.

Considering first its mechanical connection for effecting a quick retract turn of the sleeve 100, it should be observed that the motor 251 drives a stroke disk 280 (Fig. 15) through a speed reduction gearing in a casing 281, the disk being revolved one full revolution for full retraction of the taper slide 39. This stroke disk is connected by an eccentric crank pin 282 with a link 283, which is in turn pivotally connected at its outer end with a reciprocable rack 284. For each cycle of operation the motor 251 turns the stroke disk 280 one full revolution in a clockwise direction from the position shown, this latter position being that which the parts occupy at the completion of the infeeding movements effected by the feed motor 250 as described above and just prior to instituting of retraction. The rack 284 slides in a stationary housing 285 (see Fig. 16) on rollers 286 and meshes with a pinion 287 on a shaft 288 which is revolubly journaled on the housing 285. Loosely journaled on this shaft is a disk 289 having a sector of teeth 290 thereon (see Fig. 15) meshing with a sector of teeth 291 on the ring 100a fixed to the sleeve 100 as heretofore described. Accordingly, when the rack 284 is drawn to the right (as viewed in Fig. 15) by a clockwise rotation of the stroke disk 280, the disk 289 is oscillated counterclockwise through the engagement of a pawl 292 on it with a notch 293 in a disk 294 fixed to the shaft 288 which carries the pinion 287 (see also Fig. 16). As a result the ring 100a, and attached sleeve 100 are revolved clockwise to fully retract the grinding wheel. This retraction movement is, of course, effected in the same manner as when the hand lever 102 is swung to the right from the position shown in Fig. 15 as described heretofore in connection with the manual operation of the machine.

The rack 284 also serves to revolve a second pinion 295 (Fig. 15) for turning the dresser feed shaft 120. The pinion 295 is journaled in a housing 296 (see also Fig. 17) which receives the rack 284 and has in it a roller 297 on which the rack rides. The pinion 295 in turn meshes with a segment of teeth 298 on a collar 299 encircling the stationary head 300 in which the dresser feed shaft 120 is journaled. On this collar 299 is a pawl 301 (Figs. 15 and 17) engageable with a segment of ratchet teeth 302 on a hand wheel 122. Consequently, each stroke of the motor driven rack 284 causes the pawl 301 to advance the hand wheel 122 a predetermined increment of distance for effecting a corresponding feeding motion of the dresser mechanism 25.

When the shaft 120 is turned, as described above, to feed the dresser mechanism the automatic compensating arrangement previously described in connection with the manual operation of the machine shifts the grinding wheel so as to compensate for the material removed from it in the course of the subsequent dressing. By way of review, note, by reference to Fig. 8, that when the dresser feed shaft 120 is turned, it revolves the feed screw 126 for shifting the nut 128 on the dresser slide 41 and at the same time revolves the nut 39 (through gears 140, 141, 142) so that the nut 89 is moved along the stationary screw 86 and in turn moves the wheel slide 40 which is attached to this nut.

In order automatically to energize the retract motor 251 to initiate the operation described above when all of the incremental infeeding movement of the grinding wheel has been completed, a cam 305 (Figs. 16 and 19) is arranged to encircle the gear 101 fast on the sleeve 100. After the sleeve 100 has been revolved a sufficient distance to complete the infeed of the grinder, the lobe of the cam 305 engages and lifts a cam follower roller 306 on the end of a bell crank 307 pivoted at 308 on the frame. The bell crank is thus swung clockwise (as viewed in Fig. 19) so that its lower end actuated the switch LS4. As will hereinafter appear in greater detail in connection with the circuits, this switch LS4 prepares the circuits so that further motion of the work slide 47 will be stopped upon the completion of the next succeeding stroke of the latter.

Deenergization of the retract motor 251 after completion of one full revolution is accomplished by the switch LS6 (Fig. 15). A cam lobe 308 is provided on the stroke disk 280 and as the latter starts to revolve in a clockwise direction, the switch LS6 remains in the position shown until after it has passed over this lobe. Then it drops into a second position and is finally returned to its initial position after the disk 289 has completed one full revolution. It is this return of the switch to its initial position which effects deenergization of the motor 251.

Also associated with the mechanism shown in Fig. 15 is a switch LS5 for starting the complete automatic cycle outlined above when the operator throws the hand lever 102 from its full retract position (to which it has been moved manually or by the action of the motor 251 at the end of the previous cycle) to a position in which the incremental feed is to begin. To throw the switch LS5 for this purpose, a dog 309 is fixed to the disk 289 to project beyond the latter's periphery )see also Fig. 16). The dog 309 is arranged to engage an upstanding pin 310 pivoted at its lower end to swing sidewise for a limited distance between fixed stops 311. A tension spring 312 yieldably urges the pin 310 over against the right hand one of the stops 311, as shown. At its upper end portion the pin 310 is connected through a centrally pivoted link 313 and second link 314 with the switch LS5. Accordingly, as the disk 289 is revolved in a clockwise direction by swinging the lever 102 toward a feed position as noted, the dog 309 will strike the pin 310 and swing it over to the left, thereby actuating the starting switch LS5. As the pin 310 strikes the left hand stop 311, however, the dog 309 is positively arrested so that the handle 102 cannot be swung further. After the automatic cycle has been started by this actuation of the switch LS5, the pin 310 is automatically withdrawn from the path of the dog 309. For this purpose a solenoid IS (Fig. 16) is arranged, when energized, to lift its armature 315 and thereby pull up on the inner end of a centrally pivoted lever 316. The pin 310 is pivoted on the outer end of this lever 316 so that the pin is pulled down out of the path of the dog 309. By means which will hereinafter appear, the solenoid IS is energized during the first stroke of the work slide 47 and well before the first feed movement of the disk 289. Once the pin 310 has been pulled down, after being pushed to the left by the dog, it will, upon later deenergization of the solenoid IS spring up against the face of the dog 309 but will not block it. It should also be noted at this point that the faces of the pin 310 and dog 309 are contoured so that the dog can cam freely over and depress the pin 310 when the disk 289 is turning in the opposite or counterclockwise direction during the operation of the retraction motor 251.

It should be observed that the machine can be initially set up so that the active edge of the grinding wheel 111 will be located any predetermined distance from the center line of the work at the instant at which the throw of the lever 102 is arrested by engagement of the dog 309 with the pin 310 to institute the automatic cycle, as described above. In other words, the initial depth of cut for the grinding wheel during the first stroke of the work slide 47 can be predetermined as desired. For this purpose the size-determination wheel 83 (Fig. 8) is turned to adjust the position of the wheel slide 40 on the taper slide 39. The position of the wheel slide on the taper slide determines, of course, the displacement of the active edge of the grinding wheel with respect to the work when the taper slide is drawn forward to the fixed position determined by the engagement of the dog 309 with the pin 310. In this way precision adjustment through the hand wheel 83 can be made for the initial depth of cut. The final depth of cut is similarly limited by the full-forward stop position of the taper slide, i. e., by the stop engaging the handle 102 in its full feed position, and the amount of each increment of infeed between the initial and final depths of cut is predetermined by the setting of the ratchet guard 272, as heretofore described.

In the course of the foregoing description reference has been made to the operation of limit switches LS4, 5, 6 and 7. Of the other three limit switches provided, LS1 is actuated when the work slide 47 reaches the respective opposite ends of its predetermined path of travel. For this purpose, the switch LS1 is mounted on the bed adjacent the work slide 47 (Figs. 1 and 15) and has a pivoted operating lever 317 arranged with its upper end projecting between spaced dogs 318 adjustably mounted on the side of the work slide. These dogs engage the lever 317 and actuate the switch LS1 to its alternative positions at respective opposite ends of the path of travel for the work slide. The limit switches LS2 and LS3 are, on the other hand, associated with the dresser mechanism 25 and are arranged to be actuated by dogs (not shown) at respective opposite terminals of the movement of the dresser parts.

A number of manually operable switches are also included in the control apparatus to facilitate various selection operations with respect to the cycle and to institute the operation not only of the cycle as a whole, but of various ones of the motors used in it when the machine is being operated by manual rather than cyclic control.

These switches may be mounted at any convenient point or points on the machine, such, for example, as on a panel 320 adjacent the operator's station at the front of the machine (Fig. 1).

*Electric control circuits and operation*

Current is supplied for all of the various motors, excepting the wheel motor 26, from three main supply lines $L_1$, $L_2$, $L_3$, which are connected to a suitable source of three-phase alternating current by a main disconnect switch M9. Suitable lower voltage current for the control circuit proper is derived from a step-down transformer 400 having a primary winding connected across the supply lines $L_1$, $L_3$ and a secondary winding with a lead $L_4$ connected to one terminal and leads $L_5$ and $L_6$ connected to the other terminal. Accordingly, the control devices may be energized by connecting them across either the lines $L_4$, $L_5$ or $L_4$, $L_6$.

The wheel motor 26 is adapted to be connected across lines $L_7$ and $L_8$ from a suitable source of direct current.

As a preliminary to automatic cyclic operation, manual switches $M2r$ and $M2f$ are set to obtain the desired table speed respectively in reverse and forward directions of translation. Selector switch M10 is set for the hand of the thread of the lead screw. Selector switch M13 is set into the "on" position for automatic wheel feed. Selector switches M6 and M61 are set in the "on" position for automatic dresser operation as determined by a counter having a clutch coil A and an actuating coil B. Selector switch M15 is set for dressing after a predetermined number of grinding strokes. In this adjustment, the coil B is energized and deenergized each time the table motor 31 is started to count a stroke. The switch M15 can also be set for dressing after a predetermined number of pieces, in which event the coil B is energized each time the limit switch LS4 is closed to stop the wheel feed at final depth.

Normally, a coil relay CR30 is connected across the lines $L_4$ and $L_5$, and is effective to connect a roughing speed rheostat R in the field circuit for the wheel motor 26 across the lines $L_7$ and $L_8$.

Initially, a manual switch M3 is closed momentarily, thereby energizing starter relay C. This relay closes holding contacts $C_1$ and contacts $C_2$ for starting the coolant motor 26a. The control circuit is maintained until stop switch M4, master stop switch M14 or an overload device in the line $L_6$ is opened.

A refrigerator motor 321 for the coolant is optional, and if employed will be started simultaneously with the coolant motor 26a through excitation of starter relay D to close motor contacts $d_1$, provided thermostat switch $d_2$ is closed.

The relay C also closes contacts $C_3$, thereby connecting the wheel motor 26 for operation.

The control is adapted to be set for different kinds of machine cycles. When dressing is desired only after the final cut, automatic retract of the grinding wheel may be retained. In the present instance, we have described for purposes of illustration, a cycle including dressing after a number of passes and before the last pass. In this event, the pawl 292 is lifted to disable the automatic retract.

With the motors 26a, 321 and 26 in operation, the machine cycle is started by operating the hand feed lever 102 to feed the wheel into the work to the desired depth for the first cut, and to close switch LS5 momentarily. Closing of switch LS5 causes excitation of relay CR1 which closes holding contacts $CR1_1$ and $CR1_3$, also contacts $CR1_4$ to connect solenoid 26b for opening the coolant valve. The circuit for the relay CR1 remains closed unless stop switch M8, or master stop switch M14, or an overload control in the line $L_6$ is opened.

The switch $CR1_3$ causes excitation of the forward feed relay FW. This relay closes the forward contacts FW1 for the table motor 31, also contacts FW2 for closing a circuit through slow speed relay E or fast speed relay F depending on the setting of the switch $M2f$. As shown, the relay E is excited, and serves to close the contacts $E1$ in the circuits for the motor 31. If the relay F were excited, it would close the fast speed contacts F1 for the motor 31.

The table now moves in a forward direction for the first cut on the work, and the operation will continue unless a thermo-guard connected through lines 322 and 323 in the line $L_6$ or some other overload or manual switch interrupts the control circuit. During this movement, plugging switch FW3 is closed to connect lines 324 and 325. The relay E also closes contacts E2 to complete a circuit through timing relay TR1 which, when energized and after a time delay, effects energization of relays CR5 and CR8 by closing contact $TR1_1$, contact FW3 having been previously closed. Relay CR5 closes holding contact $CR5_4$.

Relay CR8 closes contacts $CR8_3$, $CR8_4$ and $CR8_2$ respectively to energize relays CR2, CR3 and CR9. These relays respectively close holding contacts $CR2_4$, $CR3_3$ and $CR9_1$. When relay CR8 is energized, it also opens contacts $CR8_1$ to interrupt the circuit through the coil B in the counter which thereupon registers one count.

Relay CR9, when energized, closes contacts $CR9_2$ and $CR9_3$ to excite a solenoid IS which operates the feed stop pin 310 to permit subsequent increments of wheel feed toward the work.

At the end of the table movement in the forward direction, that is to the right, limit switch LS1 is operated to interrupt the circuit through the relay FW and to close a circuit through the relay REV. As a result, the table motor 31 is plugged quickly to a stop. The plugging switch FW3 reverses to interrupt the circuit through the relay CR5, and the contacts E2 and $CR5_5$ are opened to interrupt the circuit through the relay TR1. Deenergization of the relay TR1 in turn causes opening of the switch $TR1_1$ which opens the circuit for the relay CR8. Deenergization of the relay CR5 permits closing of contacts $CR5_3$ to close a circuit for a relay WF, contacts $CR1_2$ and $CR2_5$ being already closed by relays CR1 and CR2. The relay WF closes the starting contacts WF1 for the wheel feed motor 259. At the start of the feed operation, limit switch LS7 is operated to deenergize relay CR2. However, the limit switch LS7 establishes a holding circuit for the relay WF across contacts $CR2_5$ so that the wheel feed motor 259 continues to operate until the switch LS7 is again actuated into initial position.

Deenergization of relay CR2 and subsequently relay WF permits closing of contacts $CR2_1$ and WF1 to complete a circuit through the relay REV. This relay closes contacts REV1 to complete the reverse circuits for the table motor 31, and contacts REV2 to reestablish the circuit for the relay E which, in turn, closes the slow speed contacts E1 to initiate operation of the motor. If the switch M27 were in the reverse position, the relay F would be energized to close the fast speed contacts F1 in the circuits for the motor 31. The table now starts on its reverse stroke and the plugging switch FW3 is in its reverse position to connect lines 325 and 327.

Excitation of the relay E again closes contacts E2 to complete the circuit through the relay TR1, and this relay after a time relay again closes the switch TR1$_1$ to complete the circuit for relay CR8. The relay REV closes contacts REV3 to complete a circuit through relay CR4 which closes holding contacts CR4$_4$. Relay CR8 again closes the circuit for relay CR2 and opens contact CR8$_1$ to again deenergize the actuating coil B of the counter, which thereupon registers the second count.

The table continues in its reverse movement to the left until the limit switch LS1 is again actuated, this time to interrupt the circuit for the relay REV and to close the circuit for the relay FW. As a result, the table motor 31 is plugged to a quick stop. Relay E is deenergized and relay CR4 is also deenergized. As a consequence, contacts E2 and CR4$_5$ are opened to interrupt the circuit for relay TR1. This causes opening of the switch TR1$_1$ to deenergize relay CR8.

Upon being deenergized, relay CR8 permits closing of the circuit for the coil B, and relay CR4 permits contacts CR4$_3$ to close whereby to again complete a circuit for the relay WF. The relay WF again closes contacts WF1 to start the wheel feed motor 250. When the feed mechanism starts to operate, limit switch LS7 is operated to interrupt the circuit for the relay CR2 and closes a holding circuit for the relay WF. Consequently, the motor 250 continues to operate until the limit switch LS7 is again actuated at the end of the feed operation to reestablish the original connections. The operating coil of the table motor relay FW is then again energized as previously described and the table motor 31 starts to operate to move the table in a forward direction from left to right. The plugging switch again connects lines 324 and 325. The operating coil of relay TR1 is energized and after a time delay the operating coils of relays CR3 and CR5 are energized as previously described. Relay CR8 closes the circuit for relay CR2 and opens the circuit for the coil B of the counter which registers a third count.

Assuming that the counter was set for three strokes, it closes contacts B1 to complete a circuit through relay CR6.

Relay CR8 closes contacts CR8$_4$ which, in series with the limit switch LS6, closes a circuit for relay CR3. Relay CR3 closes holding contacts CR3$_3$ and also closes contacts CR3$_2$ in the circuit for relay DFE. When the table reaches the end of its forward movement to the right, limit switch LS1 is again operated and the table motor 31 is plugged to a quick stop, thereby resulting in deenergization of relays CR5 and CR8. Deenergization of relay CR5 permits contacts CR5$_2$ to close, and deenergization of relay CR6 closes contacts CR6$_3$ thereby completing the circuit for the relay DFE.

Excitation of relay DFE closes contacts DFE$_1$ to close the circuits for the dresser feed motor 251 and also opens contacts DFE$_2$ to interrupt the circuit for relay CR30.

As the dresser feed mechanism starts to operate, limit switch LS6 is opened to interrupt the circuit for relay CR3, but at the same time establishes a holding circuit for relay DFE. Consequently the dresser feed motor 251 continues to operate until the limit switch LS6 is again actuated to interrupt the circuit for relay DFE. Relay DFE further closes contacts DFE$_3$ to establish a circuit for relay DF which in turn closes holding contacts DF8 and closes contacts DF1 to close a circuit for relay CR32. Excitation of relay CR32 opens the contacts CR32$_1$, CR32$_2$, CR32$_3$, and CR32$_4$ to insure deenergization of relays CR30 and CR31 and the closing of contacts CR30$_4$ and CR31$_4$. As a consequence, the rheostat D is interposed in the field circuit for the wheel motor 36. It will be understood that the field circuit includes a relay FPR which when energized closes contacts FPR$_1$ in the line L$_6$ across lines 328 and 329 to stop the machine if the wheel motor field is deenergized.

During energization of relay DFE contacts DFE$_3$ are closed and contacts CR3$_1$ are opened. When relay CR3 is deenergized, contacts CR3$_1$ are closed to complete a circuit through relay DF which immediately closes the holding contacts DF8. The relay DF also closes contacts DF9 to close the circuits for the dresser motor 29 which starts to operate in a forward direction, and opens contacts DF7. Immediately after the start of the forward operation of the motor 29, both limit switches LS2 and LS3 are closed. When the dresser completes its forward operation, limit switch LS2 is opened, thereby opening contacts DF9 and permitting contacts DF7 to close. This will complete a circuit for relay DR which upon excitation will close contacts DR1 to reverse the rotation of the motor 29 until the limit switch LS3 is again opened.

Upon completion of the dressing operation, the relay WF will again be energized and the wheel feed motor 250 will operate. As the feed mechanism starts, the limit switch LS7 will be disengaged and the operating relay CR2 will be deenergized. The wheel feed motor 250 will continue to operate until the limit switch LS7 is again reengaged. In this operation of the motor 250 the grinding wheel is advanced to the final size of the work to be ground. At the end of such feeding motion, limit switch LS4 will be closed to energize relay CR10. Also upon deenergization of relays DF and DR contacts DF1 and DR1 are opened to deenergize relay CR32. Relay CR30 already being deenergized by opening of switch contacts CR10$_4$, relay CR31 will be energized to introduce rheostat F in the field circuit for the wheel motor 26. Deenergization of relay WF also establishes a circuit for relay REV so that the table starts on its final movement in the reverse direction from right to left. In the same manner as previously described, the relays TR1, CR4 and CR8 are energized. The relay CR1 is then deenergized and when the limit switch LS1 is opened this time, the motor 31 will be plugged to a quick stop and the automatic cycle of the machine will be complete.

Upon engagement of limit switch LS4 as described, the counter is reset for the next cycle. The operator now retracts the wheel slide manually, removes the finished workpiece and inserts an unground workpiece for the next cycle.

To operate the dresser in a hand cycle selector switches M6 and M61 are moved into "on" position and then switches M5 or M51 are actuated to operate the dresser feed mechanism and the dresser. The relay CR32 is energized at the same time, and the speed of the wheel motor 26 is governed by the rheostat D.

If it is desired to run the dresser continuously, either selector switch M6 or M61 is moved into continuous position and then either of the switches M5 or M51 is operated. The dresser and dresser feed will continue to operate until switches M6 and M61 are both turned to the "on" position or "off" position.

It will be seen that we have provided a new and improved selective dressing control. Within this range of the counter, dressing of the grinding wheel will take place, at the will of the operator, after any preset number of work passes and after each multiple thereof during the grinding of a given work piece, or after the grinding of any preset number of work pieces and after any multiple thereof. The wheel can be dressed, if desired, after each work pass, or just before the final pass, or at the completion of the work piece.

Through selective connection of the rheostats R, D and F in the field circuit for the motor 26, the grinding wheel spindle can be driven at independently selected adjustable speeds respectively before, during and after each dressing operation in the grinding of a work piece. These speeds may be the same or individually different for rough grinding, wheel dressing and finish grinding.

We claim as our invention:

1. In a grinding machine, in combination, a base, a work support on said base, a rotary spindle supporting a grinding wheel for cutting engagement with the work, means for effecting relative reciprocation back and forth in successive passes between said support and said wheel, means for driving said spindle and being automatically operable in response to said reciprocation to vary the peripheral speed of rotation of said spindle for grinding at different speeds as the grinding progresses, and means automatically operable in timed relation to said reciprocation to effect a normal relative cross feed between said support and said wheel both before and after variation in the speed of rotation of said spindle.

2. In a grinding machine, in combination, a base, a work support on said base, a rotary spindle supporting a grinding wheel for cutting engagement with the work, means for effecting relative reciprocation back and forth in successive passes between said support and said wheel, an electric motor for driving said spindle, electric control means for said motor actuated in response to said reciprocation to cause said motor to operate at one peripheral speed during one portion of the normal grinding operation and at another peripheral speed during another portion of said operation, and means automatically operable in timed relation to said reciprocation to effect a normal relative cross feed between said support and said wheel during both of said portions of said operation.

3. In a grinding machine, in combination, a base, a work support on said base, a rotary spindle supporting a grinding wheel for cutting engagement with the work, means for effecting relative reciprocation back and forth in successive passes between said support and said wheel, means for effecting a relative cross feed movement between said support and said wheel in timed relation to said reciprocation, an electric motor for driving said spindle and having a motor field circuit, a plurality of optionally available adjustable rheostats, and electric control means operable automatically by said support as an incident to said reciprocation at different stages in the cycle of machine operation within the range of said cross feed movement to connect said rheostats selectively into said circuit.

4. In a grinding machine, in combination, a base, a work support on said base, a rotary spindle supporting a grinding wheel for cutting engagement with the work, means for effecting relative reciprocation back and forth in successive passes between said support and said wheel, means for effecting a relative cross feed movement between said support and said wheel in timed relation to said reciprocation, an electric motor for driving said spindle, and having a speed control circuit, three optionally available rheostats, and electric control means automatically operable in timed relation to said support as an incident to said reciprocation to connect said rheostat singly and successively into said circuit at successive stages in the machine operation within the range of said cross feed movement.

5. In a grinding machine, in combination, a base, a work support on said base, a rotary spindle supporting a grinding wheel for cutting engagement with the work, means for effecting relative reciprocation back and forth in successive passes between said support and said wheel, for rough grinding, and then a final pass for finish grinding, means automatically operable in timed relation to said reciprocation to effect a normal relative cross feed between said support and said wheel for both rough and finish grinding and means including a counter for counting said passes and being automatically operable under the control of said counter to drive said spindle at one speed during said successive passes for rough grinding, and at a different speed during said final pass for finish grinding.

6. In a grinding machine, in combination, a base, a work support on said base, a rotary spindle supporting a grinding wheel for cutting engagement with the work, means for effecting relative reciprocation back and forth in successive passes between said support and said wheel, means automatically operable in timed relation to said reciprocation to effect a normal relative cross feed between said support and said wheel, and means for driving said spindle, said last mentioned means including a counter for counting said passes and being automatically adjustable under the control of said counter to drive said spindle at one selectively adjustable speed during the initial pass or passes and at another selectively adjustable speed during the final pass or passes.

7. In a grinding machine, in combination, a base, a work support on said base, a rotary spindle supporting a grinding wheel for cutting engagement with said work, means for effecting relative translation between said support and said wheel, means for automatically dressing said wheel at an intermediate predetermined stage in the machine operation, and means for driving said spindle, said last mentioned means being automatically operable in timed relation to the progress of the machine operation to drive said spindle at independently selected speeds respectively prior to dressing, during dressing and after dressing of said wheel.

8. In a grinding machine, in combination, a base, a work support on said base, a rotary spindle supporting a grinding wheel for cutting engagement with said work, means for effecting relative translation between said support and said wheel, means for automatically dressing said wheel at an intermediate predetermined stage in the machine operation, an electric motor for driving said spindle, electric control circuits for controlling the operation and speed of said motor and including three independently adjustable electric speed control elements, and means automatically operable in timed relation to the institution of operation of the aforesaid dressing means and to said translation between said support and said wheel before and after dressing to selectively render said elements functionally operative, whereby to drive said spindle at independently selected speeds respectively during initial grinding, dressing and final grinding.

9. In a grinding machine, in combination, a base, a spindle for driving a grinding wheel, a work support mounted on said base for reciprocation in a succession of passes across said wheel, a dressing device automatically operable to dress said wheel at a predetermined point in the machine operation, an electric motor for driving said spindle and including a field circuit, two adjustable rheostats adapted for selective connection in said circuit, a counter automatically operable to register the number of passes of said support, and electric control means operable by said counter after a preset number of passes to institute operation of said dressing device and simultaneously to cut out one of said rheostats from said circuit and connect the other of said rheostats in said circuit.

10. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a dressing device operable to dress said wheel, a counter selectively adjustable to register either a predetermined number of passes in the grinding of each work piece or alternatively a predetermined number of work pieces ground to final depth, variable speed means for driving said spindle, and control means automatically operable by said counter to institute operation of said dressing device after completion of said predetermined number of passes or pieces, depending for which said counter is set, and concurrently adjusting said variable speed means.

11. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a dressing device operable to dress said wheel, a counter selectively adjustable to register either a predetermined number of passes in the grinding of each work piece or alternatively a predetermined number of work pieces ground to final depth, variable speed means for driving said spindle, and control means automatically operable by said counter to institute operation of said dressing device after completion of said predetermined number of passes or pieces, depending for which said counter is set.

12. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a counter, a dressing device operable to dress said wheel, control circuits including a first limit switch operable upon each feed movement of said wheel to final depth to register a count on said counter, control circuits including a second limit switch operable upon each pass of said support to register a count on said counter during the grinding of a given work piece, selector means for rendering one or the other of said control circuits functionally operative, and control circuits responsive to a preset number of counts on said counter for instituting operation of said dressing device through a dressing cycle.

13. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a dressing device operable to dress said wheel, a counter, control circuits including a first limit switch operable upon each feed movement of said wheel to final depth to register a count on said counter, control circuits including a second limit switch operable upon each pass of said support to register a count on said counter during the grinding of a given work piece, selector means for rendering one or the other of said control circuits functionally operative, and control means responsive to a preset number of counts on said counter for stopping said support and concurrently instituting operation of said dressing device, and upon conclusion of the dressing cycle to reinstitute operation of said support.

14. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a counter, a dressing device operable to dress said wheel, control circuits operable upon each feed movement of said wheel to final depth to register a count on said counter, control circuits operable upon each pass of said support to register a count on said counter during the grinding of a given work piece, selector means for rendering one or the other of said control circuits functionally operative, and control circuits responsive to a preset number of counts on said counter for instituting operation of said dressing device through a dressing cycle.

15. In a grinding machine, in combination, a base, a spindle for driving a rotary grinding wheel, a work support mounted on said base for relative back and forth translation in a succession of passes across said wheel, means for relatively feeding said wheel automatically toward said work in increments in timed relation to said passes to final depth in the grinding of each work piece, a dressing device operable to dress said wheel, a counter, control circuits operable upon each feed movement of said wheel to final depth to register a count on said counter, control circuits operable upon each pass of said support to register a count on said counter during the grinding of a given work piece, selector means for rendering one or the other of said control circuits functionally operative, and control means responsive to a preset number of counts on said counter for stopping said support and concurrently instituting operation of said dressing device, and upon conclusion of the dressing cycle to reinstitute operation of said support.

HAROLD N. SEYFERTH.
GORDON H. CORK.

REFERENCES CITED

The following references are of record in the file of this patent:

UNITED STATES PATENTS

| Number | Name | Date |
|---|---|---|
| 2,101,795 | Flygare et al. | Dec. 7, 1937 |
| 1,917,468 | Steiner et al. | July 11, 1933 |
| 2,033,395 | Peaslee | Mar. 10, 1935 |
| 2,056,871 | Silven | Oct. 6, 1936 |
| 2,162,038 | Trible | June 13, 1939 |
| 2,167,614 | Silven | July 25, 1939 |
| 2,174,029 | Blood et al. | Sept. 26, 1939 |
| 1,933,028 | Baule | Oct. 31, 1933 |
| 2,187,227 | Flanders | Jan. 16, 1940 |
| 1,644,512 | Cornelius | Oct. 4, 1927 |
| 2,171,892 | Richardson | Sept. 5, 1939 |
| 2,251,961 | Snader | Aug. 12, 1941 |
| 2,292,875 | Flanders | Aug. 11, 1942 |